United States Patent [19]

Fernandez et al.

[11] Patent Number: 4,947,257

[45] Date of Patent: Aug. 7, 1990

[54] RASTER ASSEMBLY PROCESSOR

[75] Inventors: Antonio Fernandez, Brooklyn, N.Y.; Hugo P. Gaggioni, Randolph, N.J.; Martin J. Jaquez, San Diego, Calif.; John D. Robbins, Mountain Lakes; E. Scott Soper, Morristown, both of N.J.

[73] Assignee: Bell Communications Research, Inc., Livingston, N.J.

[21] Appl. No.: 253,269

[22] Filed: Oct. 4, 1988

[51] Int. Cl.[5] .............................................. H04N 5/262

[52] U.S. Cl. .................................... 358/183; 340/723; 340/734; 340/799; 358/22

[58] Field of Search ................. 358/183, 22, 903, 146; 364/521, 522; 340/721, 723, 720, 734, 750, 799, 798

[56] References Cited

U.S. PATENT DOCUMENTS

| | | | |
|---|---|---|---|
| 4,266,242 | 5/1981 | McCoy | 358/22 |
| 4,599,611 | 7/1986 | Bowker et al. | 358/183 |
| 4,689,677 | 8/1987 | Hedley et al. | 358/183 |
| 4,768,083 | 8/1988 | Romesburg | 358/181 |
| 4,769,762 | 9/1988 | Tsujido | 364/521 |
| 4,773,026 | 9/1988 | Takahara et al. | 364/521 |
| 4,780,710 | 10/1988 | Tatsumi | 340/723 |
| 4,783,648 | 11/1988 | Homma et al. | 340/721 |
| 4,789,963 | 12/1988 | Takahashi et al. | 364/521 |
| 4,806,919 | 2/1989 | Nakayama et al. | 340/723 |
| 4,814,884 | 3/1989 | Johnson et al. | 358/183 |
| 4,827,253 | 5/1989 | Maltz | 358/183 |
| 4,829,454 | 5/1989 | Kurakabe et al. | 340/723 |
| 4,851,834 | 7/1989 | Stockebrand et al. | 340/799 |
| 4,862,154 | 8/1989 | Gonzalez-Lopez | 340/799 |
| 4,866,524 | 9/1989 | Six | 358/183 |
| 4,890,257 | 12/1989 | Anthias et al. | 364/521 |
| 4,908,700 | 3/1990 | Ishii et al. | 358/183 |

FOREIGN PATENT DOCUMENTS

| | | | |
|---|---|---|---|
| 0004670 | 1/1982 | Japan | 358/13 |

OTHER PUBLICATIONS

"How To Build A Mixed Mode Terminal-Basic Concepts and an Example", Naoto Tanabe et al., Proceedings of Globecome '86, pp. 471–478, Dec. 1986.

"Intelligent Communication Terminal For Integrating Voice, Data and Video Signals", S. Tsuruta et al., Proceedings of ICC '86, pp. 1509–1513, Jun. 1986.

*Primary Examiner*—John W. Shepperd
*Assistant Examiner*—James Juo
*Attorney, Agent, or Firm*—James W. Falk

[57] ABSTRACT

A system for combining a plurality of video signals and various forms of still imagery such as text or graphics into a single high resolution display is disclosed. The invention system utilizes a multiport memory and a key based memory access system to flexibly compose a multiplicity of video signals and still images into a full color high definition television display comprising a plurality of overlapping windows.

15 Claims, 14 Drawing Sheets

WINDOWS ASSEMBLED FOR DISPLAY

VIEW TO BE ASSEMBLED

RASTER ASSEMBLY PROCESSOR

FIELD OF THE INVENTION

The present invention relates to a system for composing a plurality of video signals and still image signals including text and graphics into a full color High Definition Television (HDTV) display.

BACKGROUND OF THE INVENTION

Video and graphic display systems are rapidly becoming the most important source of information, communication, and entertainment in today's society The growing demand for new visual services and applications imposes a high level of complexity and performance on such display systems.

Advances in image processing and memory technology have produced continuous improvements in picture quality and display capabilities for two apparently unrelated classes of visual signals: full motion video signals and high resolution still images (text, graphics, and pictures). However, there is a general lack of signal and raster processing technology that can simultaneously satisfy the different spatial and temporal requirements of the video and still image signals. This makes the composition of still images and video for display on a single high resolution output raster a difficult task. Research efforts to define and develop integrated still image and video user interfaces have only just started and have generally not yielded entirely satisfactory results. (See e.g. N. Tanabe et al. "How to Build a Mixed Mode Terminal-Basic Concepts and an Example", Proceedings of Globecome '86, pp. 471–478, Dec. 1986 and S. Tsurauta et al, "Intelligent Communications Terminal for Integrating Voice, Data, and Video Signals", Proceedings of ICC '86, pp. 1509–1513, June 1986.)

Still imagery composition on engineering work stations, personal computers and graphic production systems benefits from the use of high resolution displays. However, a basic deficiency of these systems is the inability to accept video signals as inputs and manipulate them as windows on the display.

Today's video production industry makes use of video special effects processors that can compose several overlapping video windows. Examples of such special effects processors are the Ampex Corporation ADO system and Abakus Video System A52 processor. (A further example of a television special effects system is disclosed in McCoy U.S. Pat. No. 4,266,242.) To enter still imagery into the compositions produced by such video special effects systems, the still image is converted into a video signal that may be manipulated as any other video signal. Typically, the resolution of the images produced by such special effects systems is limited by the quality of the 525 or 625 line video format used throughout the processor. Furthermore, such existing video effects systems can only assemble a few video signals at a time (typically a maximum of four or five) so that the maximum number of still image windows is also limited to this number. While more complex compositions can be built with the aid of video tape recorders in the television production environment, this is inadequate for interactive visual applications dominated by still image windows.

Auxiliary processors to overlay a full motion video window on the display of a graphics workstation are also becoming increasingly available. Examples of this approach include the NEC EWS-E Advanced Workstation of NEC Information Systems, Inc. and the 1280/640 series processors of Parallax Graphics. While a significant step towards media integration, the integration is not achieved without a penalty in picture quality and composition flexibility. Video is treated as a special case, not subject to the workstation's agile ability to format text, graphics and pictures.

In view of the above, it is an object of the present invention to provide a system that can flexibly compose video and still image signals to form a single integrated display. More particularly, it is an object of the present invention to provide a system for composing a plurality of video and still image signals including text and graphics into a full color High Definition Television display. It is a further object of the invention to provide a display system which enables the dynamic allocation of display area to multiple windows of video and still images.

SUMMARY OF THE INVENTION

The present invention is a raster assembly processor which receives a plurality of full motion video and still image input signals and assembles these signals into a full bandwidth color component high resolution video output signal, illustratively, in standard HDTV format (i.e. NHK-SMPTE 1125-line HDTV format).

In accordance with the present invention, a display of a typical broadband multi-media application is organized into a plurality of overlapping windows. Each window may comprise a video or a still image. A still image may be a still picture, text or graphics To define how the windows cover each other, each window is considered to have a unique distance from the viewer. A complete description of a window's location includes its spatial location (X and Y coordinates) and its (imaginary) position relative to an axis perpendicular to a surface of the display (Z axis).

To assemble multi-media displays of the type described above, a single high performance multiported memory system is utilized. Illustratively, the memory system serves to assemble high resolution rasters at a rate of 30 frames per second.

Each signal (still image or video) to be incorporated as part of a display is processed and delivered to the memory system via a dedicated input channel. Analog video in component form (R,G,B) is first digitized. The input video signals are then spatially scaled so that they can fit in particular windows in a display. Still imagery in raster form is transferred to the memory system by means of a picture data interface. Raster data is read out of the memory by means of a multiplexer which combines the signals present on a plurality of memory output channels into an interlaced 30 frame/sec HDTV signal.

A key based memory access system is used to determine which pixels of incoming signals are written into the memory at particular memory locations to properly reflect the visibility of a predetermined pattern of windows. More particularly, to arrange a display, Z values are stored in the memory corresponding to a pattern of overlapping windows. For example, the memory locations corresponding to a large window may be assigned a value Z=4. The memory locations corresponding to a small window which occludes a small portion of the larger window are provided with the key value Z=3. In this manner, a pattern of overlapping windows is built up. To change the pattern of overlapping windows, it is necessary to write new Z values into the memory.

In addition to establishing a pattern of overlapping windows, it is necessary to write into the memory, the video and still image signals which will be displayed in the windows defined by the pattern. This is accomplished as follows. Each pixel to be written into the memory requires four bytes. Three bytes contain R, G, B color component values. The fourth byte of each pixel to be written into memory is known as the "key byte". The "key byte" contains a Z value. The key byte of a pixel to be written into memory acts as a "key" in achieving access to an addressed location in the memory. A pixel which forms part of an input signal may be written into memory at an addressed location, only if its key (i.e. Z) value is identical to the key (Z) value already stored in memory at this location. For example, pixels comprising an image to be displayed in the large window mentioned above defined by Z=4 are provided with a key byte Z=4. However, such pixels cannot be displayed in the occluded portion of the large window, since only pixels with a key byte of Z=3 can gain access to memory locations having a Z=3 value. In this manner, the key based memory access system provides a unified approach for determining which pixels of incoming signals should be written in the memory system at particular locations to properly reflect the visibility of a window. To change the image displayed at a particular window, it is only necessary to write new pixels into the memory locations corresponding to the particular window. It is not necessary to change the Z values stored in memory which define the window pattern.

The memory system itself utilizes a unique architecture formed from three types of devices. A plurality of Memory Modules serve to actually store raster data. Memory Module Interface units (MMIs) and Memory Channel Interface units (MCIs) provide the necessary memory management; the main tasks being to synchronize, buffer and route address, data and control information between the input and output channels and the memory modules. Illustratively, each Memory Channel Interface contains channel control circuitry, and storage to synchronize and buffer memory access requests (e.g. read or write requests) for a group of four asynchronous channels The Memory Channel Interfaces communicate via the Memory Module Interfaces with the appropriate Memory Modules to service the requests Illustratively, the devices comprising the memory system enable 256 million 4-byte memory access requests per second for a total transfer capacity of eight Gigi-bits per second.

In short, the present invention is a processor system which assembles a plurality of video and still image input signals into a full bandwidth color component high resolution video output signal in HDTV format. In contrast with prior art technology, the processor of the present invention provides a number of significant advantages including the capability of flexibly and dynamically composing video and still images to form a single high resolution full color display, the capability of simultaneously presenting a multiplicity of video and still image windows, and the capability of displaying overlapping windows.

DETAILED DESCRIPTION OF THE DRAWING

FIG 1*a* and FIG 1*b* schematically illustrate a multimedia display of a type that can be formed using the raster display processor of the present invention;

FIG. 2 schematically illustrates the inputs and outputs of the raster assembly processor in accordance with an illustrative embodiment of the present invention;

FIG. 3 schematically illustrates the architecture of a raster display processor in accordance with an illustrative embodiment of the present invention;

Figure 6:
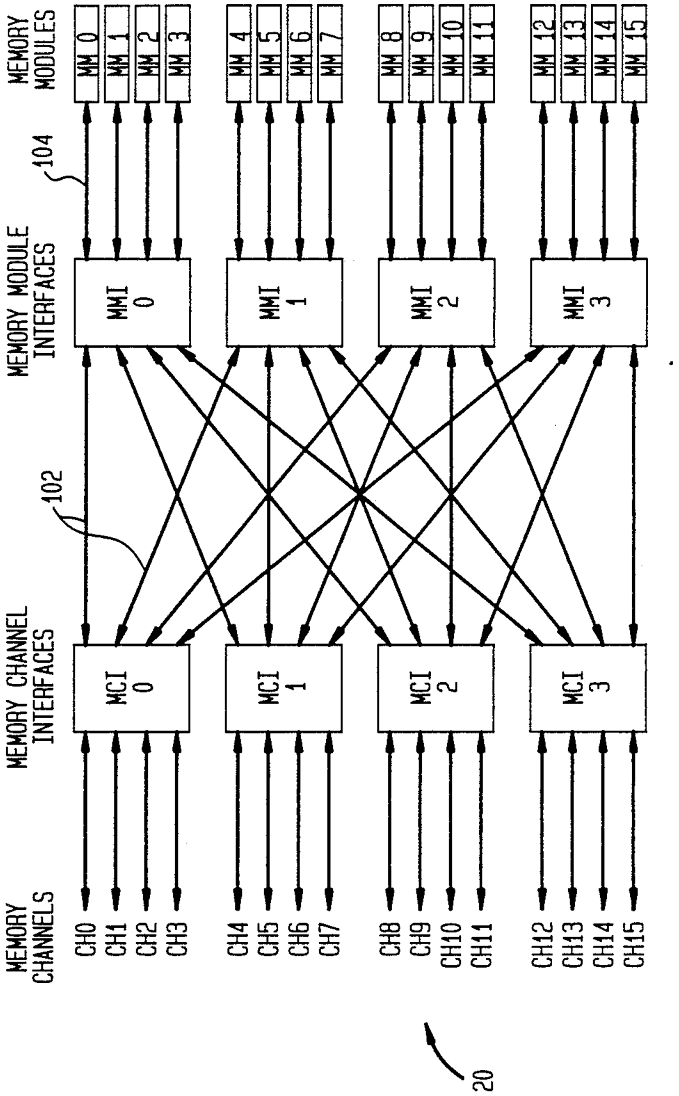
FIG. 6 illustrates the overall architecture of the memory system which form part of the raster assembly processor of FIG. 3.
Figure 8:
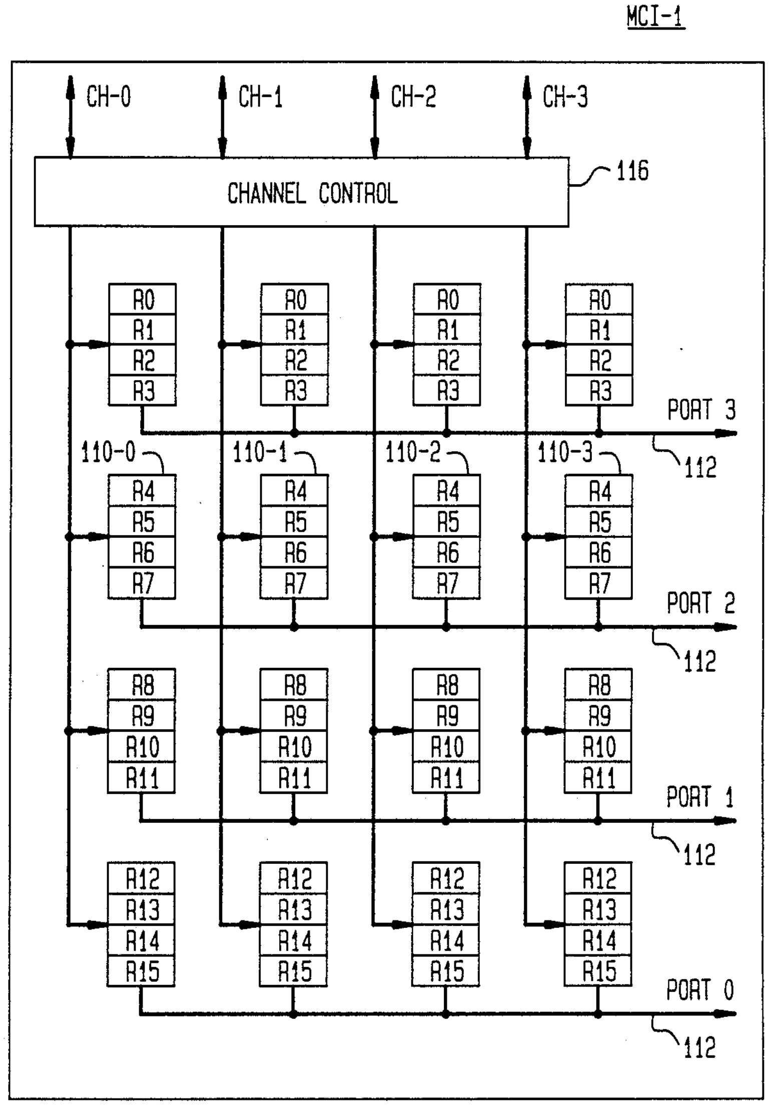
Figure 9:
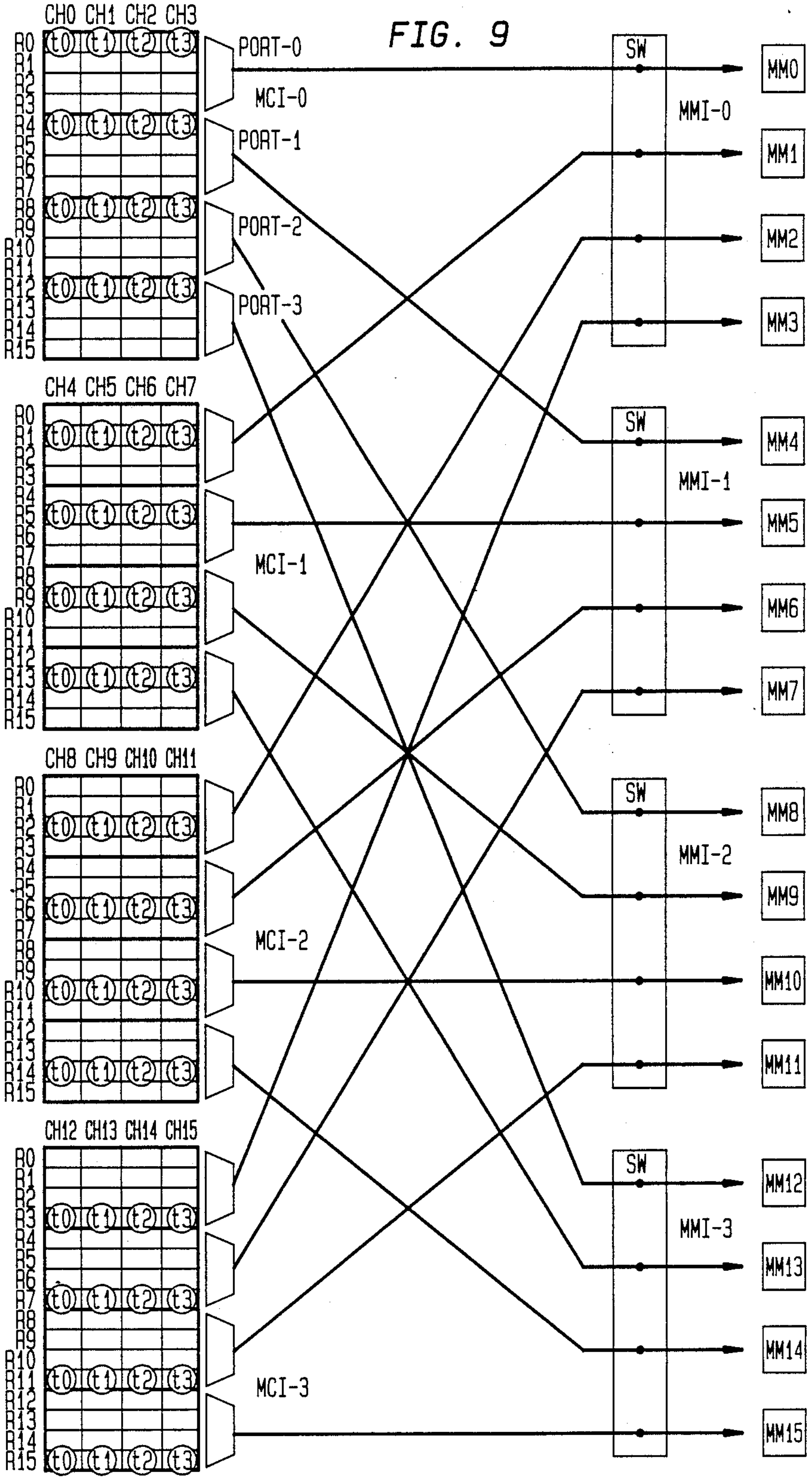
Figure 10:
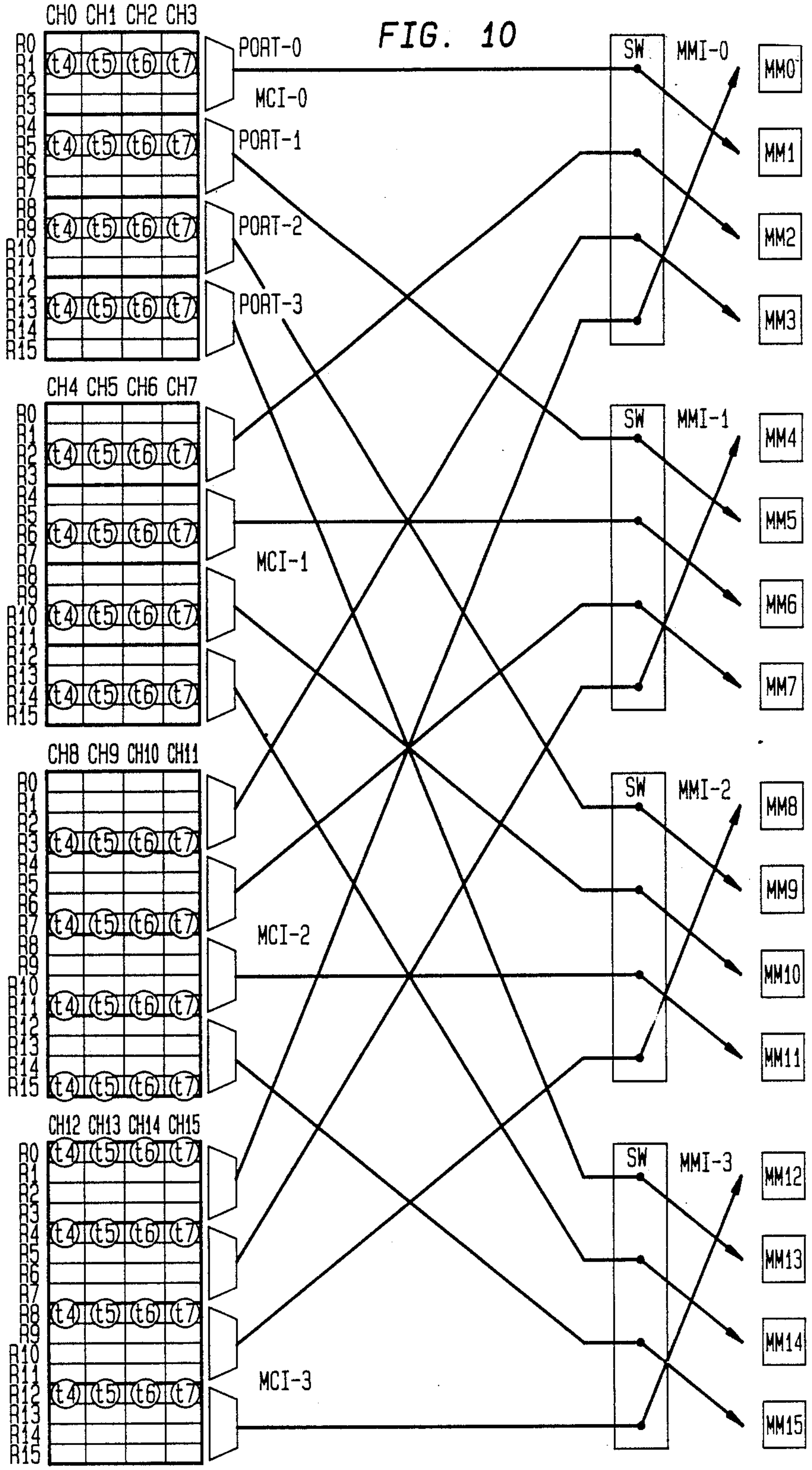
Figure 11:
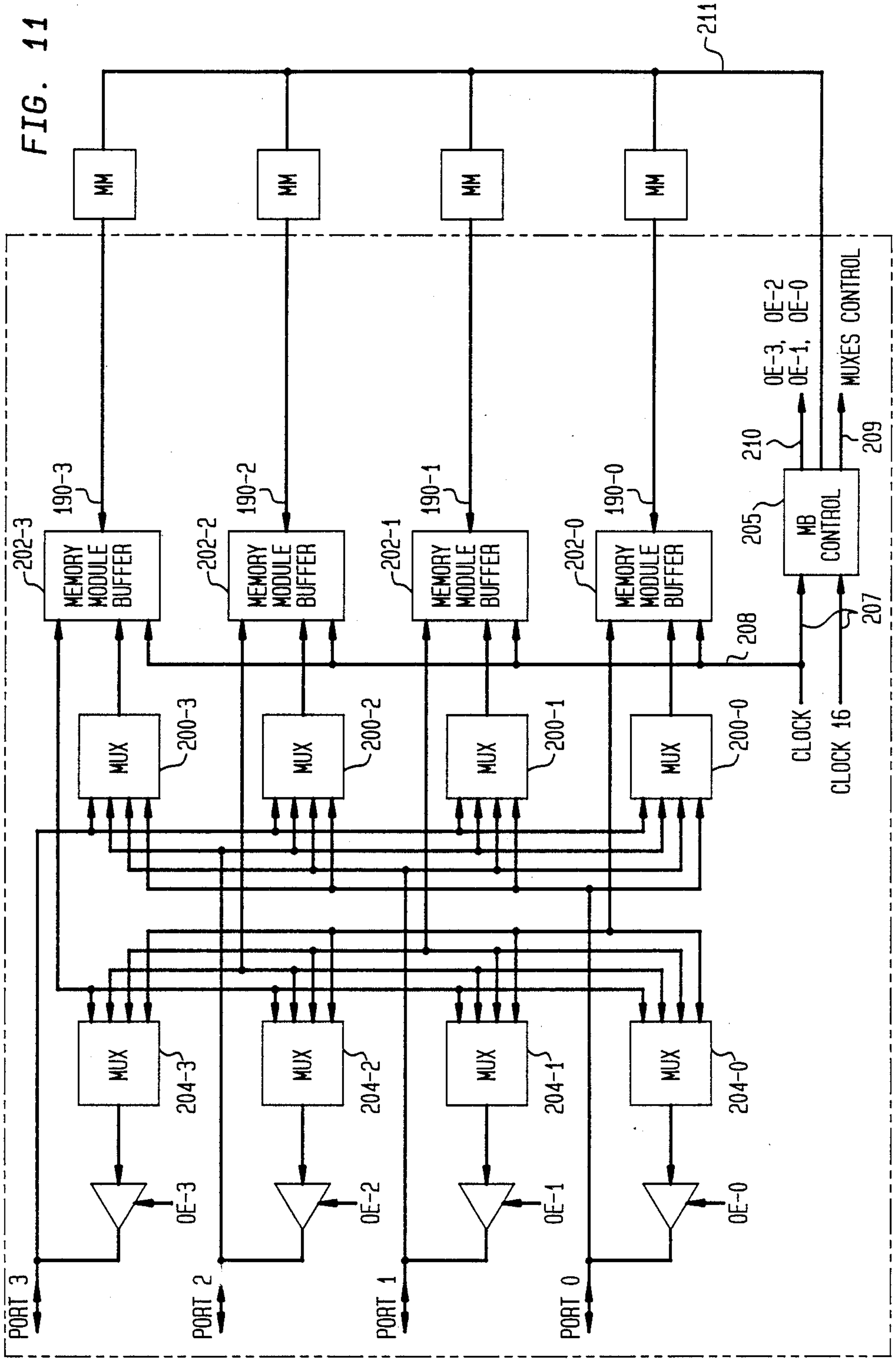
Figure 12:
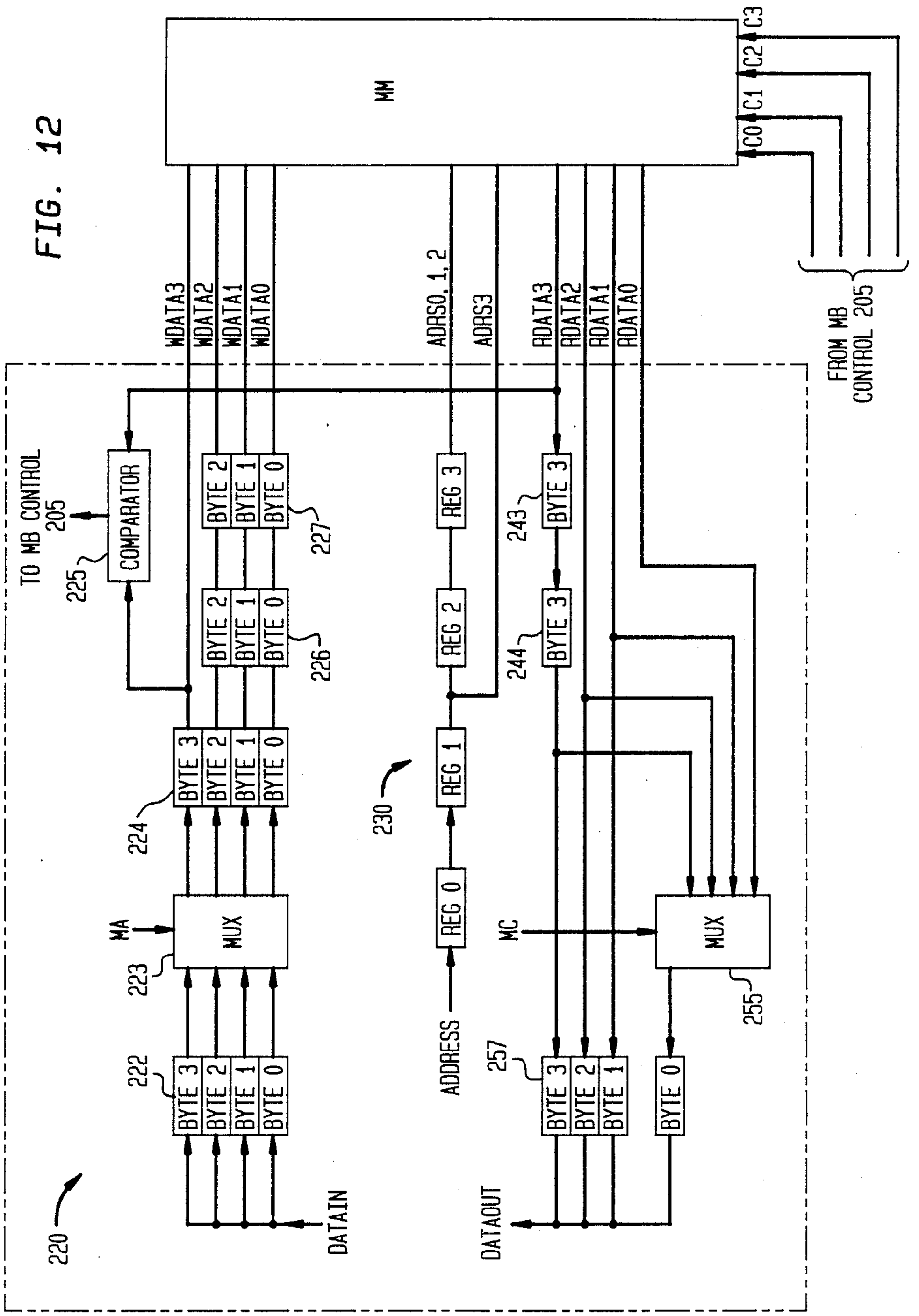

FIG. 8 schematically illustrates a Memory Channel Interface unit of the memory system of FIG. 6;

FIGS. 9 and 10 schematically illustrate the multiplexing scheme between the Memory Channel Interface units and Memory Module Interface units of FIG. 6;

FIG. 11 schematically illustrates a Memory Module Interface used in the memory system of FIG. 6;

FIG. 12 schematically illustrates a Memory Module Buffer unit for use in the Memory Module Interface of FIG. 11.

Figure 13:
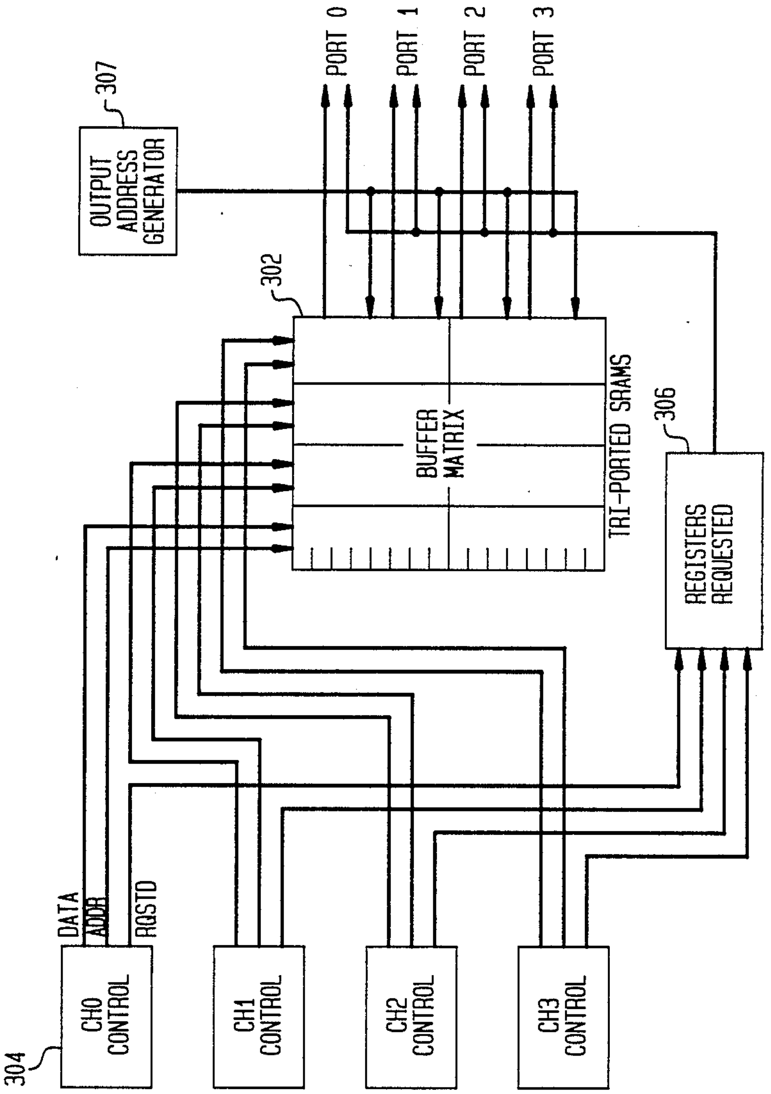
Figure 14:
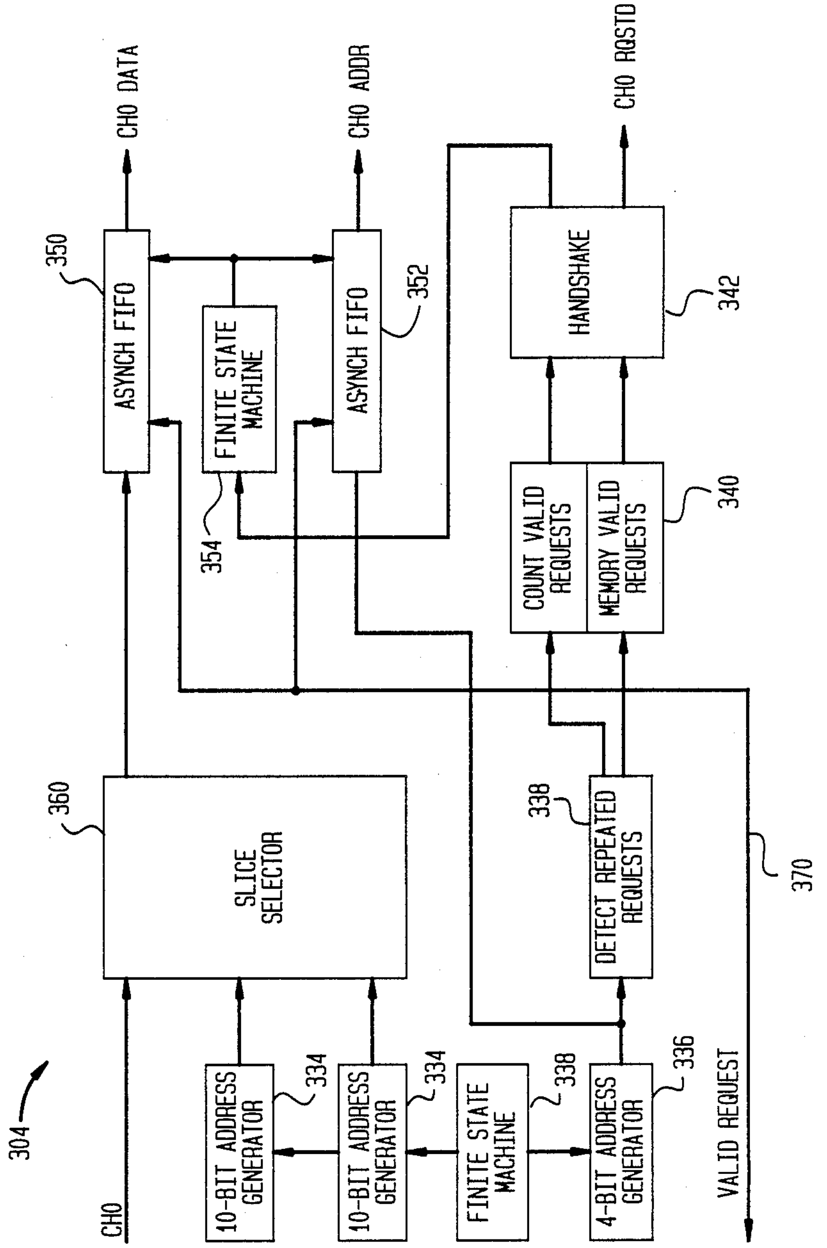

FIG. 13 schematically illustrates a bit sliced Memory Channel Interface device; and FIG. 14 schematically illustrates a channel control circuit for the device of FIG. 13.

DETAILED DESCRIPTION OF THE INVENTION

A. Overview Raster Assembly Processor

The present invention is a processor for creating multimedia displays including full motion video and various forms of still images. The inventive processor, known as the raster assembly processor, will compose a multiplicity of video signals and still images into a full color HDTV display.

Figure 1A:
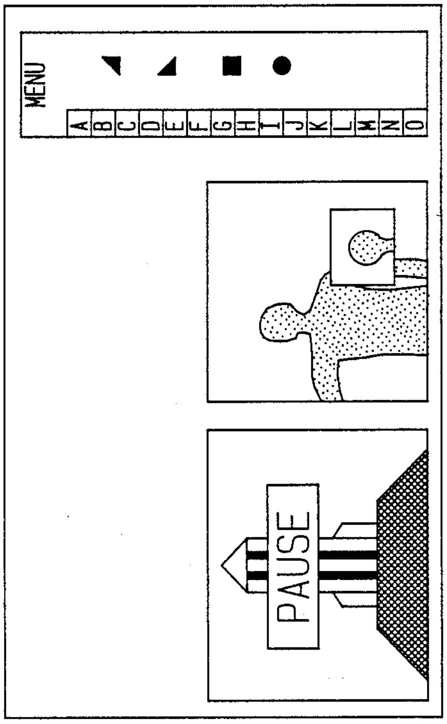

FIG 1*a* shows a display of the type which can be formed using the processor of the present invention. The display comprises a plurality of windows, each of which contains a video image, or a still image, which still image may be a still picture, text or graphics. In an illustrative embodiment of the invention, a display comprising up to 256 windows may be created, with up to four windows containing video images.

Figure 1B:
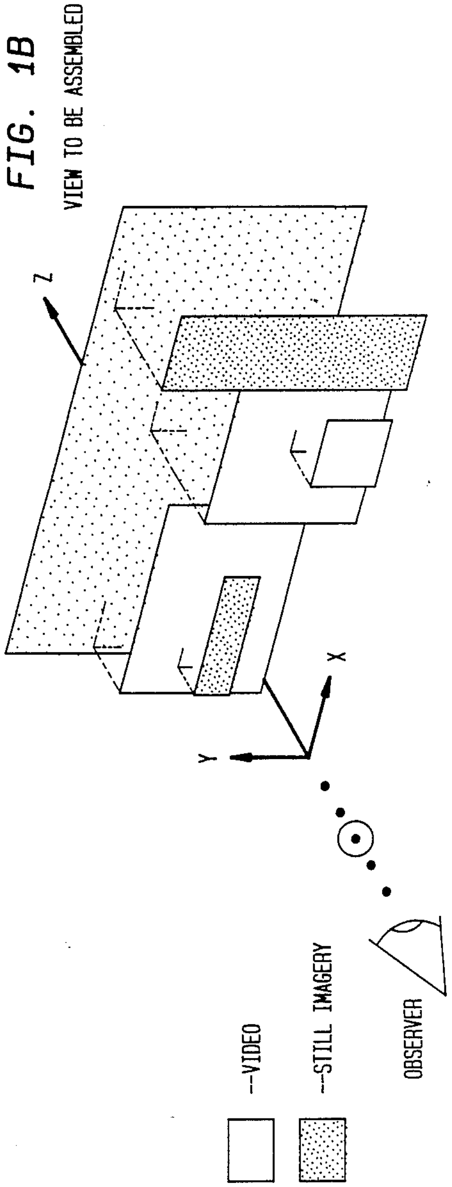

FIG 1*b* schematically illustrates how the display of FIG. 1*a* is assembled. As shown in FIG 1*b*, the display of FIG 1*a* may be viewed as comprising a plurality of overlapping windows. In FIG 1*b*, the still image windows are shown as shaded and the video image windows are unshaded. As shown in FIG 1*b*, each window is considered to have a unique distance from the viewer, thus defining how the windows cover each other. A complete description of a window's location comprises its spatial location (X and Y coordinates) and its (imaginery) position relative to an axis perpendicular to the surface of the display (Z coordinate). Each window may be freely positioned in X-Y plane and may have an arbitrary depth relative to the other windows being assembled. This freedom of composition is independent of whether a window contains video or still imagery.

Figure 2:
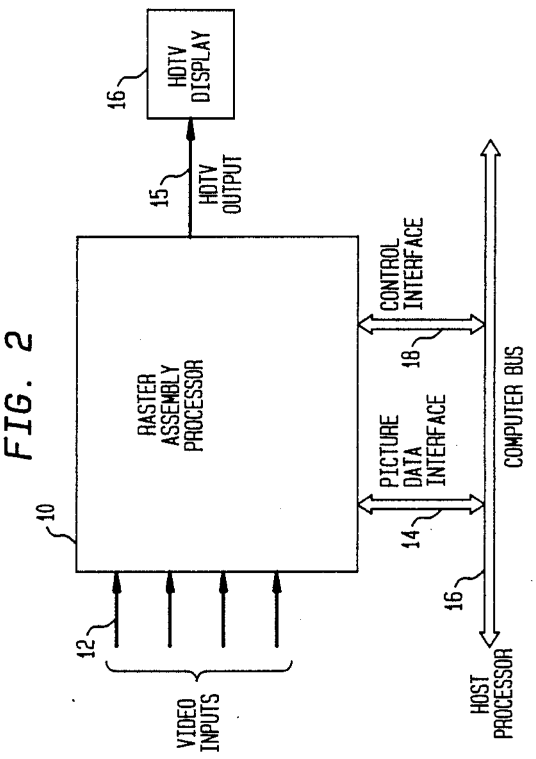

The inputs and outputs of an inventive raster assembly processor 10 are shown in FIG. 2. As shown in FIG. 2, the raster assembly processor 10 receives a plurality of 525 line component color (R,G,B) video signals via video inputs 12. Still image data is provided to the raster assembly processor 10 via the picture data interface 14 and the computer bus 16. The signals transmitted via the inputs 12, 14 are combined in the raster assembly processor 10 to form an output signal of the type shown in FIGS. 1*a*, 1*b*. Illustratively, the output signal is an NHK 1125 line HDTV signal which is transmitted via output 15 to an HDTV display 16. To control the composition of the HDTV output signal to be displayed, the raster assembly processor is in communication with a host computer via the computer bus 16 and control interface 18.

Figure 3:
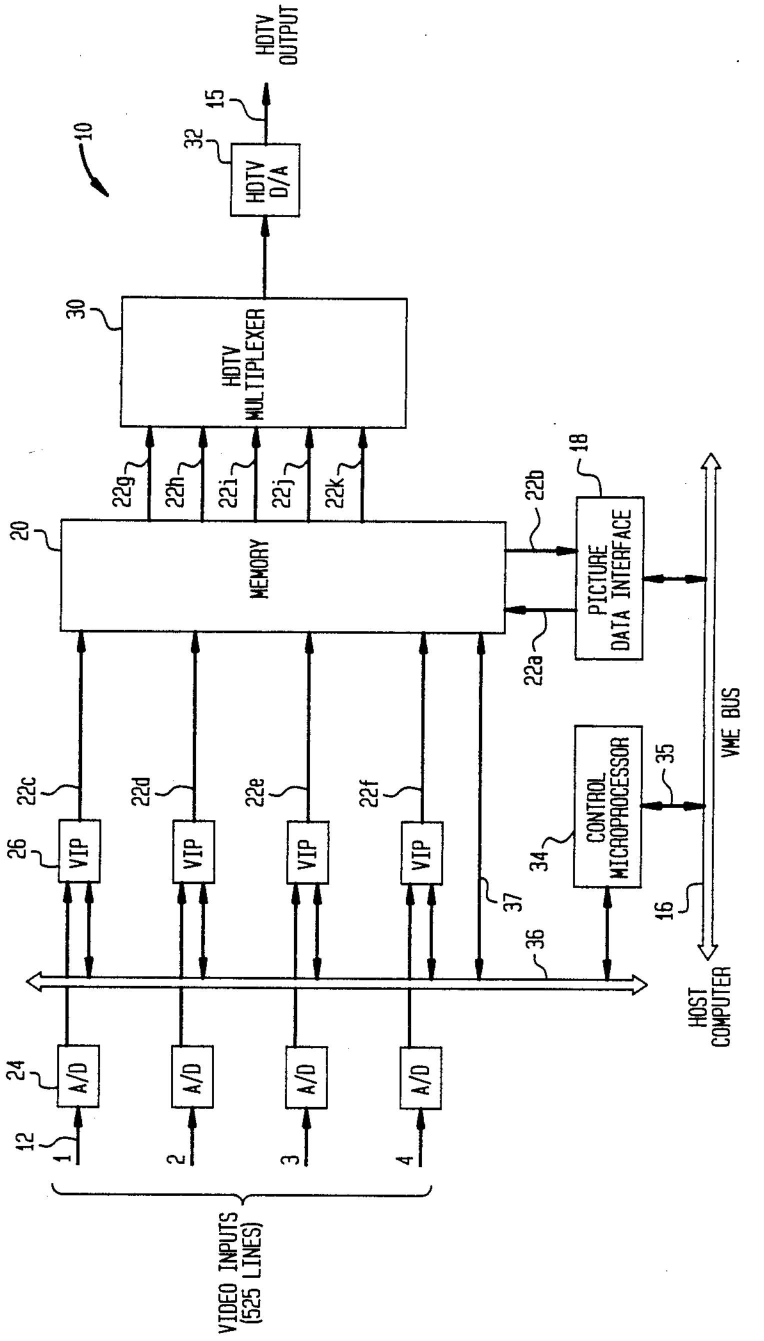

The architecture of the raster assembly processor 10 is shown in more detail in FIG. 3. An important feature of the illustrative embodiment of the invention shown in FIG. 3 is the use of high performance multiported memory system 20 for the assembly of high resolution rasters at 30 frames per second. Typically, the memory 20 provides storage for a 1024 line by 2048 pixels/line array. Each independent memory port or channel 22 provides random access to addressed memory location at a maximum channel rate of 16 mega-pixels (words) per second. In the embodiment of the invention shown in FIG. 3, a total of eleven channels are used to transfer still picture data (input channel 22*a*, output channel 22*b*), video to be assembled (input channels 22*c*, 22*d*, 22*e*, 22*f*), and high resolution video to be displayed (channels 22*g*, 22*h*, 22*i*, 22*j*, 22*k*) into and/or out of the memory system 20.

Each video signal to be written into memory system 20 is processed and delivered to the memory system 20 via a dedicated input channel 12. Analog video in component form (R,G,B) is first digitized in an 8-bit analog-to-digital (A/D) converter 24 with individual digital-feedback clamping and sync regeneration circuitry. Following the CCIR 601 recommendation, a sampling frequency of 13.5 MHz is used for each full bandwidth component, producing rasters with 483 lines and 720 active pixels per line. This sampling is locked to the horizontal frequency of the incoming video signal of a given channel and is independent of all other clock signals.

Each video input signal is scaled using video input processors (VIPs) 26 so that particular video input signals can fit into particular windows in the output display. An algorithm such as Vertical and horizontal cubic spine interpolation is carried out in the video input processor 26. Using this technique, video rasters with 1 to 483 lines and 1 to 720 pixels per line may be produced with high quality under the direction of the control processor 34 which communicates with the video input processors 26 via the internal control bus 36. The resulting video input signals may then be written into the memory via one of the channels 22*c*, 22*d*, 22*e*, 22*f*.

Still imagery in the form of raster data is communicated from a host computer to the raster assembly processor by accessing the picture data interface 18 through a computer bus 16 connection.

While a single memory system output channel provides sufficient capacity for an interlaced 525 line video signal, to support a high resolution display, the capacities of the memory output channels 22*g*, 22*h*, 22*i*, 22*j*, 22*k* are combined using the multiplexer 30. Illustratively, an output HDTV sampling frequency of 74.25 MHz will be used by the HDTV multiplexer 30 to generate an interlaced 30.0 frame/second digital HDTV signal. The multiplexer reads blocks of 5 consecutive samples in parallel over the five output channels at 14.85 mega-blocks per second and then serializes them to form a mega-sample/second HDTV signal. The resulting color components are then fed to a fast digital-to-analog converter 32 for conversion to analog form. The resulting analog signal is transmitted via output 15 to a display device 16 (see FIG. 2).

A control processor (34 of FIG. 3) provides display management and real-time control of the raster assembly processor structure in response to commands from a host computer. The control processor 34 comprises a fast single board computer which receives commands from the host computer via the computer bus 16 and control interface 35. The control processor 34 provides instructions for the hardware comprising the raster assembly processor via the internal control bus 36.

B. Raster Assembly Processor Memory System

To summarize briefly, a raster assembly processor system which assembles a plurality of video and still image input signals into a full bandwidth color component high resolution video output signal in HDTV format has been described. Many of the features of the raster assembly processor are directly attributable to the capabilities of its memory system. Illustratively, the memory system has a total memory capacity of eight Megabytes.

Figure 4:
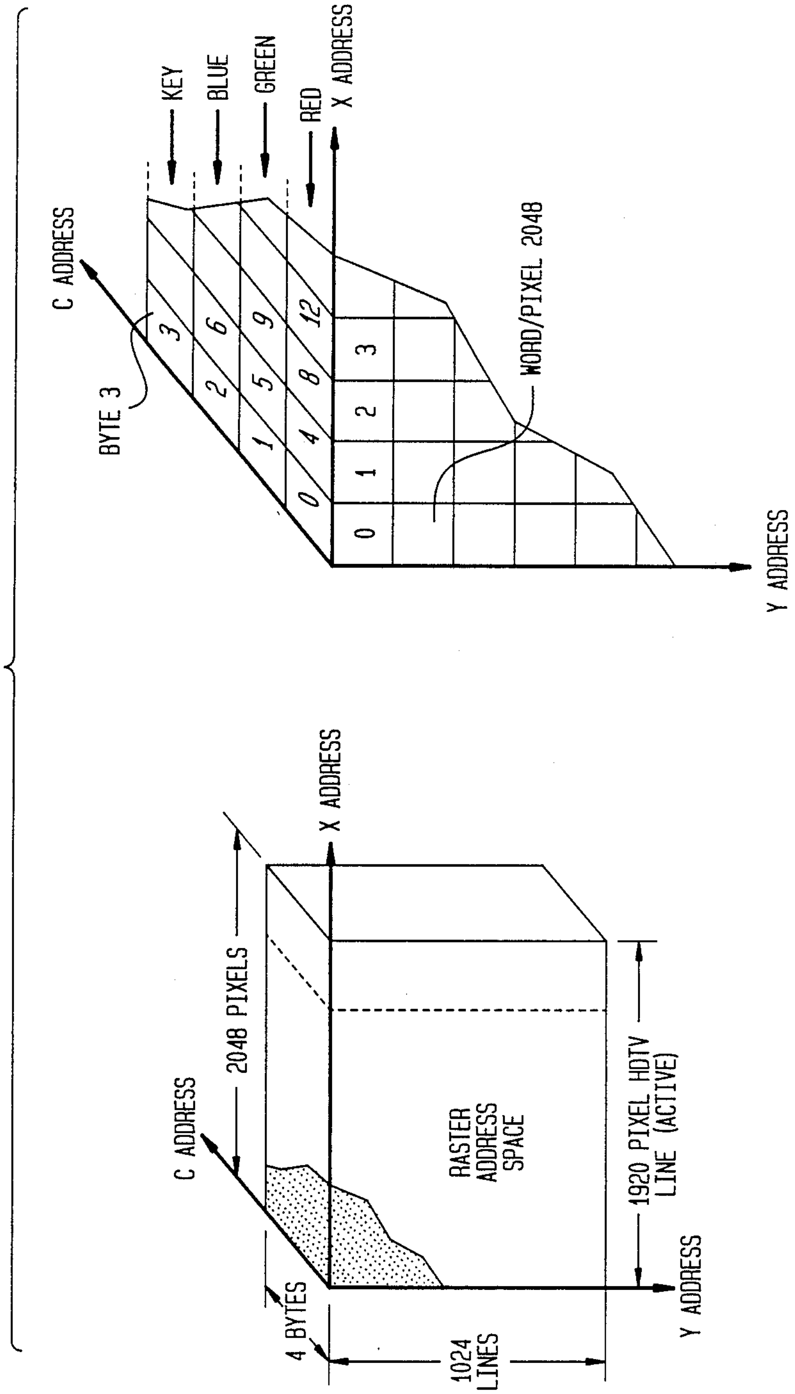
FIG. 4 illustrates the organization of data stored in the memory system of the raster assembly processor of FIG. 3.

More particularly, image data is stored in the memory in a raster format. This raster is read out of the memory to form an output display. As shown in FIG. 4*a*, the raster of memory system 20 comprises 1024 lines and 2048 pixels per line. Of the 2048 pixels per line, 1920 pixels per line are active and comprise the HDTV output signal. As indicated in FIGS. 4*a* and 4*b*, four bytes of memory are utilized to store each pixel (word). As shown in FIG. 4*b*, three bytes of each pixel (word) comprise R, G, B component values. The fourth byte of a pixel is the "key byte" which is used in connection with a key based memory access system to be described below to achieve access to particular memory location. The memory system 20 is both byte and word addressable, thus requiring 23 bits to address each of eight megabytes that constitute the total address space.

The key based memory access system is used to determine which pixels of incoming signals are written into the memory at particular memory locations to properly reflect the visibility of a predetermined pattern of windows. More particularly, to arrange a display, key (i.e. Z) values are stored in the memory corresponding to a pattern of overlapping windows.

Figure 5:
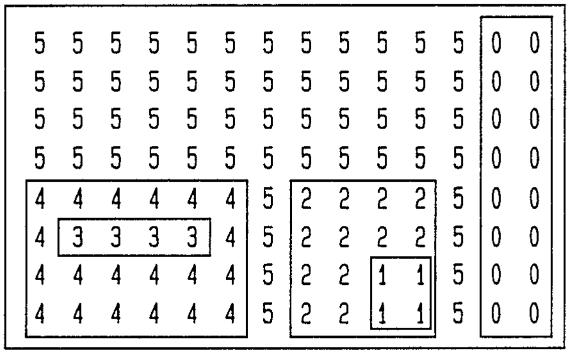
FIG. 5 illustrates how a pattern of overlapping windows is established in the memory system of the raster assembly processor of FIG. 3 through use of a key based memory access system.

FIG. 5 shows the key values stored in the memory system 20 to define the pattern of windows comprising FIGS. 1*a* and 1*b*. Illustratively, a first window is defined by the value Z=4. A small portion of this window at Z=4 is occluded by a smaller window defined by Z=3. Similarly, a portion of a window at Z=2 is occluded by a window at Z=1.

After a pattern of windows is established by storing key values, video and still image signals to be displayed in windows defined by the pattern may be written into memory. The key byte of a pixel to be written into memory acts as a "key" in achieving access to an addressed location in memory when a keyed write memory access is utilized. A pixel which forms part of an input signal may be written into memory at an addressed location only if its key (i.e. Z) value is the same as the key (i.e. Z) value already stored in the memory at this location. For example, pixels with the value Z=2 cannot achieve access to memory locations having the value Z=1. Thus, the window defined by Z=1 in FIG. 5 automatically occludes a portion of the window at Z=2 as no pixels with key value Z=2 can be written into a Z=1 memory location.

Key based memory access provides a unified approach to the problem of determining which pixels should be written into the display memory to properly reflect the visibility of a window. Once the key values have been properly set in the memory system to reflect window visibility, the contents of a window may be repeatedly changed without concern as to which portions of the new image are actually visible in the windows.

Over time, a composed display will change in two ways; the number, size, and position of windows (i.e. the display layout) will change and secondly, the contents of individual windows will change (e.g. different video or still images will appear in the same window). Since the key values specify the layout of windows, these values must be modified to provide a new layout. The key values stored in the memory 20 of FIG. 3 may be altered through use of the control processor 34 which communicates with the memory 20 via the internal bus 36 and the channel 37. To change the contents of individual windows (without changing the window pattern), input signals arriving, for example, via the channels 12 are provided with key byte values by the video input processors 26. The input video signals can then be written into the memory 20 at the locations determined by the key byte values in the manner discussed above. As indicated above, the control processor 34 itself is controlled by a host computer (not shown in FIG. 3) via the bus 16.

The components comprising the memory system 20 are illustrated in FIG. 6. As shown in FIG. 6, the memory system 20 comprises three types of functional blocks: the Memory Channel Interface (MCI), the Memory Module Interface (MMI) and the Memory Module (MM). Illustratively, the memory system 20 comprises 16 asynchronous memory access channels CH0 . . . CH15 that are soft configurable for input or output (i.e. reading or writing). The channels CH0 . . . CH15 are suitable for both video and still image data. Since only 11 channels are required to realize the processor configuration of FIG. 3, five of the sixteen available channels of the memory system 20 of FIG. 6 will be unused.

Six types of requests are supported and available for each memory channel: word (i.e. pixel) read, word (i.e. pixel) write, byte read, byte write, key word write, and no operation. As indicated above, the key byte of a word value being written acts as a "key" in achieving access to an addressed pixel location. Illustratively, each of the sixteen channels CH0 . . . CH15 operates at a rate of 16 megawords/sec. Each word comprises 4 bytes for a maximum channel transfer rate of 64 megabytes/sec. Together, the 16 channels provide an aggregate capacity of 1 giga-byte/sec.

Typically, the memory 20 contains two megawords of storage (1024 lines×2048 pixels (i.e. words) per line). The architecture of the memory 20 is based on partitioning the 2 megawords of storage into sixteen Memory Modules, MM0 . . . MM15, and providing memory management functions that allow substantially 100% utilization of each Memory Module's transfer capacity. To attain 1 giga-byte/sec of aggregate channel capacity, each memory module services up to 16 million independent word accesses per second. The Memory Channel Interfaces (MCIs) and Memory Module Interfaces (MMIs) provide the necessary memory management, the main task being to synchronize, buffer and route address, data and control information between the channels CH0 . . . CH15 and the memory modules MM0 . . . MM15.

Figure 7:
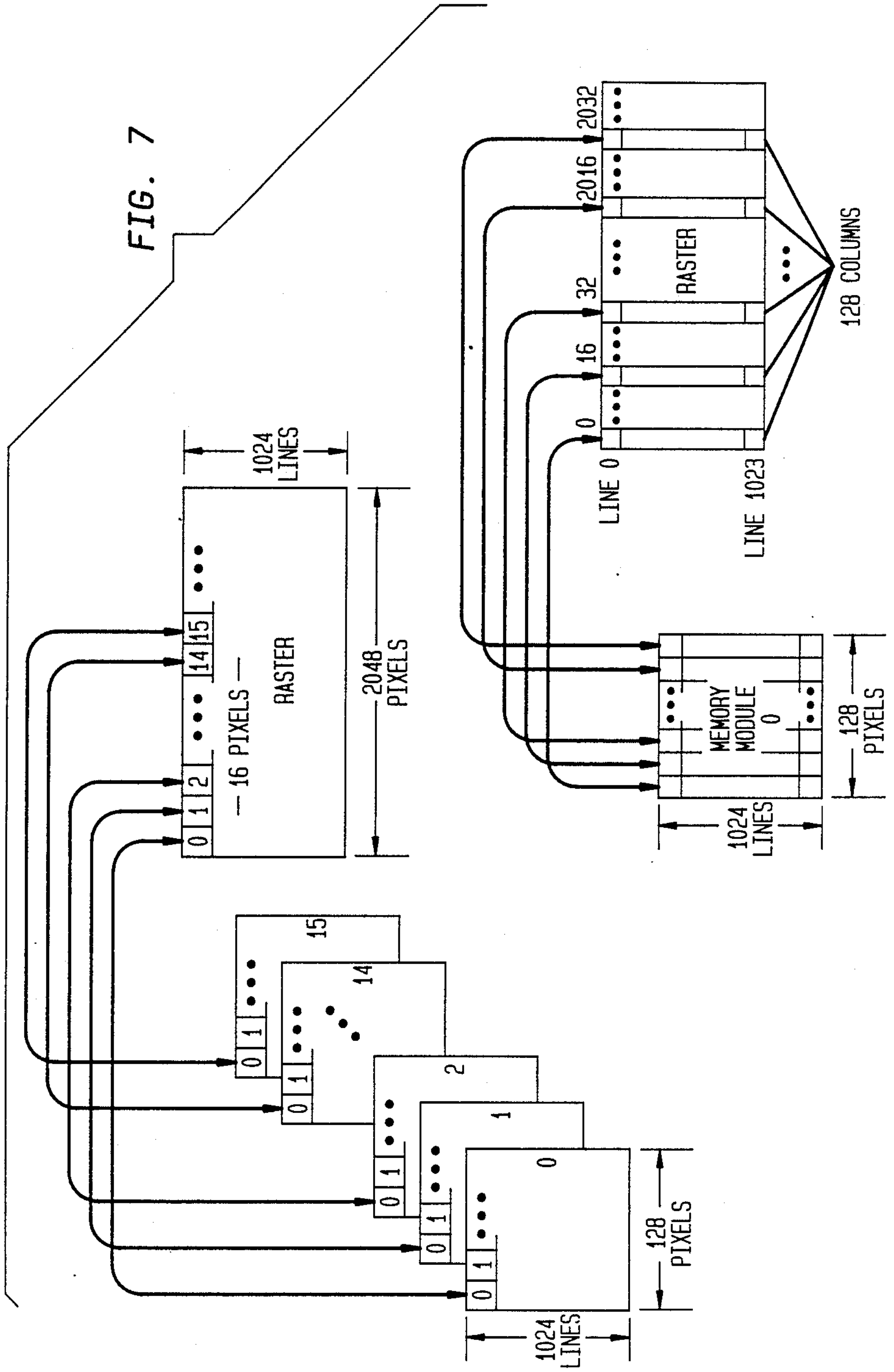
FIG. 7 illustrates how pixels are allocated to a plurality of memory modules comprising the memory system of FIG. 6.

FIG. 7 schematically illustrates how the pixels comprising a 1024 line by 2048 pixel per line raster are allocated among the Memory Modules MM0 . . . MM15. As shown in FIG. 7, each Memory Module illustratively comprises 1024 lines each having 128 pixels. Pixels from consecutive columns of the 1024 line×2048 pixel per line array are stored in consecutive Memory Module in a round robin fashion. Thus, the first row of Memory Module MM0 comprises pixels 0, 16, 32 . . . 2016, 2032 from the first row of the raster array and the first row of memory module MM1 comprises pixels 1, 17, 33 . . . 2017, 2033 from the first row of the raster. Similarly, the second row of memory module MM0 contains pixels 0, 16, 32, . . . 2016, 2032 from the second row of the raster.

As shown in FIG. 6, each of four Memory Channel Interfaces, MCI-0, MCI-1, MCI-2, MCI-3 receives memory access requests via a group of four memory channels. For example MCI-0 receives memory access requests via channels CH0, CH1, CH2, CH3. Each of the Memory Channel Interfaces is connected to each of the four Memory Module Interfaces, MMI-0, MMI-1, MMI-2, MMI-3, via lines 102. The Memory Channel Interfaces communicate with the Memory Modules via the Memory Modules Interfaces. Each Memory Module Interface MMI-0, MMI-1, MMI-2, MMI-3 communicates with four Memory Modules via the lines 104. For example MMI-0 communicates with MM0, MM1, MM2 and MM3. The four channels serviced by each Memory Channel Interface are configured as a group for input or output. Thus the raster assembly processor of FIG. 3 may be realized by configuring two of the Memory Channel Interfaces for input and two of the Memory Channel Interfaces for output.

The Memory Channel Interface MCI-1 is shown in greater detail in FIG. 8. As shown in FIG. 8, the interface MCI-1 (as well as the other MCI units) has a dedicated set of sixteen registers 110-0, 110-1, 110-2, 110-3 for each memory access channel CH-0, CH-1, CH-2, CH-3. Each register (R0 . . . R16) within a set is dedicated to a specific memory module (MM0 . . . MM15). Thus, the register R0 within each set is dedicated to the memory module MM0, and within each set, each register R1 is dedicated to the memory module MM1. For each memory access request, the MCI channel control circuitry associated with each channel CH-0, CH-1, CH-2, CH-3 determines which memory module is being requested and then stores the memory access request into the register corresponding to that memory module. Note that this operation is asynchronous for all channels.

As shown in FIG. 8, MCI-1 includes four ports (PORT 0, PORT 1, PORT 2, PORT 3). These ports serve to connect the MCI-1 to each of four MMIs. Each port is connected via the lines 112 to only four registers in each set 110. Thus as shown in FIG. 7, the registers R0, R1, R2, R3 of each set are connected to the PORT 3, and the registers R4, R5, R6 and R7 are connected to the PORT 2.

The channel control circuitry 116 associated with each channel CH0, CH1, CH2, CH3 performs two main functions. One function is to synchronize memory access requests and the other function is to generate addresses for video signals to be written into memory. To this end the channel control circuitry contains address generators which are pin programmable with initial address, final address, and address increment. Alternatively, an MCI can accept addresses supplied externally. This capability is utilized to receive still image data. In addition, the channel control circuitry includes FIFOs into which memory access request information is written at a channel clock rate (e.g. a clock rate associated with the channels CH0, CH1 etc.). Memory access request information is read out of the FIFOs synchronously with a memory clock.

The Memory Module Interfaces (MMIs) perform several functions. First, MCI ports are multiplexed with Memory Modules (MM) in a synchronous round robin fashion through use of the MMIs. In addition, the MMIs act as a buffer for address, control and data signals between the MCIs and MMs and produce the proper control signals for the Memory Modules according to the memory operation requested by the appropriate MCI. An important difference between the MMI and MCI units is that the MCI units service asynchronous memory access channels while the MMI devices are synchronous with a memory system clock.

FIGS. 9 and 10 depict the synchronous multiplexing scheme that exists between the MCIs and MMIs. In FIGS. 9 and 10, the memory access channels CH0...CH15 and registers associated with each MCI unit (MCI-0, MCI-1, MCI-2, MCI-3) are schematically illustrated. In addition, in FIGS. 9 and 10, each MMI (MMI-0, MMI-1, MMI-2, MMI-3) is represented by a multiplexing switch that interconnects four MCI output ports to four Memory Modules. The multiplexing scheme requires 16 memory clock cycles to service all of the registers associated with the MCIs, each register being serviced once in the 16 clock cycles. Thus, if the basic clock rate is 16 MHz, then each register is serviced at a rate of 1 MHz. During each clock cycle, memory access requests are transferred from the registers being serviced in that clock cycle to the appropriate Memory Module. In the case of a read operation, the read data is ultimately returned to the MCI that issued the request in a manner discussed below. It should be noted that because the MCI and MMI units operate in a pipelined fashion, physically distinct lines not shown in FIGS. 9 and 10 carry addresses for read operations between the MCIs and the MMIs and the actual read data between the MMIs and the MCIs.

The connections set up by the MMIs during the first four clock cycles (t0–t3) are shown in FIG. 9. These connections may be understood using the following example. During the first four clock cycles, PORT-0 of MCI-0 is connected to MM-0 via MMI-0. Thus during these four clock cycles the registers R0 associated with the channels CH0, CH1, CH2, CH3 are serviced. At the same time PORT-0 of MCI-1 is connected via MMI-0 to MM-1 so that the registers R1 associated with the channels CH4, CH5, CH6 and CH 7 can be serviced. As shown in FIG. 10, during the next four clock cycles t4-t7, PORT-0 of MCI-0 is connected to MM1 and the registers R1 associated with the channels CH0, CH1, CH2, CH3 are serviced. At the same time PORT-0 of MCI-1 is connected via MMI-0 to MM-2 so that the registers R2 associated with the channels CH4, CH5, CH6 and CH7 can be serviced. Similarly during the clock cycles t8-t11 PORT-0 of MCI-0 is connected to MM-3 so that registers R3 associated with channels CH0, CH1, CH2 and CH 3 are serviced and during the clock cycle t12-t15 PORT-0 of MCI-0 is connected to MM4 so that registers R4 associated with channels CH0, CH1, CH2, and CH3 are serviced. In this manner all registers associated with all MCI units are serviced once within 16 clock cycles.

The periodic transfer of memory access requests between the registers inside the MCIs and the MMIs and ultimately the Memory Modules uniformly allocates the available capacity of each Memory Module among the sixteen channels. If the basic memory clock is 16 Mhz, then a Memory module, via the MMIs, synchronously services each of its assigned registers at 1 MHz (i.e. once in sixteen basic memory clock cycles). The fact that each register is synchronously serviced at 1 MHz determines the performance limits of the video memory. The MCIs cannot accept requests for a module faster than the registers can be serviced by the MMIs and the MMs. While continuous channel access for the same module is limited, data words in memory may be accessed in raster order at a higher rate such as 16 Megahertz. As discussed above in connection with FIG. 7, the reason is that consecutive pixels from the raster are stored in different memory modules.

An MMI is shown in more detail in FIG. 11. The MMI of FIG. 11 comprises PORT 0, PORT 1, PORT 2 and PORT 3 via which information is received from and transferred to MCI units. Similarly, the I/0 ports 190-0, 190-1, 190-2, 190-3 enable communication with four Memory Modules. The input multiplexers 200-0, 200-1, 200-2, 200-3 route incoming (write) data, control and addresses from the ports PORT 0, PORT 1, PORT 2, PORT 3 to the appropriate memory module buffers 202-0, 202-1, 202-2, 202-3. The output multiplexers 204-0, 204-1, 204-1, 204-3 route outgoing data (read operations) from the memory module buffers 202 to appropriate ports via the tristate devices OE-3, OE-2, OE-1, OE-0.

The control 205 is a finite state machine which receives clock input signals via the lines 207 and outputs memory module buffer control signals via line 208, control signals for the multiplexers 200, 204, via the line 209, and control signals for the tristate devices OE-0, OE-1, OE-2, OE-3 via the line 210. Control signals for the memory modules are transmitted from the control 205 to the Memory Modules (MM) via the lines 211. The two clock signals are CLOCK (i.e. the memory system clock) and CLOCK 16 which has a rate equal to the CLOCK signal divided by the number of memory modules (e.g. 16). CLOCK 16 defines the start of a 16 cycle period during which all registers of all channels will be serviced. The control 205 utilizes CLOCK 16 to synchronize MMI and MCI operations.

A memory module buffer 202 is shown in greater detail in FIG. 12. The Memory Module Buffer 202 couples a Memory Module Interface to a Memory Module (MM). There is one Memory Module Buffer for each Memory Module. Thus each Memory Module Interface contains four Memory Module Buffers. Control signals C0, C1, C2, C3 for each of four bytes in the Memory Module (MM) are supplied from the control 205 of FIG. 11. The Memory Module buffer 202 of FIG. 12 comprises a write section 220, and address section 230 and a read section 240.

The address section 230 transmits addresses to the associated Memory Module using four registers REG0, REG1, REG2, REG3 as follows. Four registers are needed to address a pixel location in memory as each word (i.e. pixel) comprises four bytes. The addresses to BYTES 0,1,2 on line ADRS 0,1,2 are delayed relative to the address of BYTE 3 on line ADRS 3. This enables keyed write operations to take place as BYTE 3 is the key byte. However, even when a non-keyed read or write operation is taking place, the address of BYTE 3 is advanced in time relative to the addresses of the other bytes because of the pipelined nature of the system.

In the write section 220, for a word write request, four bytes of data (R, G, B, Key or BYTE 0, BYTE 1, BYTE 2, BYTE 3) are pipelined from a first set of registers 222 through a multiplexer 223 to a second set of register 224 under the control of a control signal MA. At this point, the key byte (BYTE 3) is treated differently than the other bytes (BYTE 0, BYTE 1, BYTE 2) comprising a pixel. In a key operation, the key byte (BYTE 3) is compared using comparator 225 with the key byte already stored in memory at the appropriate address before the remainder of the bytes (i.e. BYTES 0, 1, 2) are pipelined into the memory via the register sets 226, 227. If the key byte (i.e. BYTE 3) is not equal to the key byte already stored in memory, the writing is prevented. This pipeline architecture serves to delay the BYTES 0, 1, 2 a sufficient amount of time for the key value processing to take place. For this reason the address of the non-key bytes are delayed relative to the key byte in address section 230. The address of the key byte enters the MM first and the key byte already stored in the MM is read out on line RDATA3 and transmitted to the comparator 225. The comparator compares byte 3 of the word to be written into the MM with the key byte read from the MM and outputs a signal to the MMB control 205 of FIG. 11. Depending on the results of the comparison, the control 205 issues signals C0, C1, C2 which enable the word to be written into memory via the lines WDATA 2,1,0. For a non-keyed word write the bytes 0,1,2 are still delayed relative to the BYTE 3 because of the pipelined nature of the system, however, the comparator 225 is not utilized. For a byte write operation, the byte to be written arrives in register 226 in the BYTE 0 position. The multiplexer 223 under the control of control signal MA moves the byte to be written from the Byte 0 position to the proper position in the register 224 so that the byte is written into the MM in the proper location.

In the read section 230 four byte words are read from the memory via the lines RDATA 3,2,1,0. Because of the pipelined nature of the system, the key byte (i.e. BYTE 3) is read first so that this byte is then delayed relative to the other bytes by the register 243 and 244. In a byte read operation, the multiplexer 265, under the control of control signal MC, moves a byte from the BYTE 0,1,2 or 3 position to the BYTE 0 position in the register 257.

The partitioning of memory management into MCI and MMI functions was developed to minimize circuit interconnections while constrained to a maximum clock rate such as 16 MHz. To implement the MCI and MMI units bit slice partitioning may be utilized. Thus, for example, a bit slice MCI device processes an 8-bit slice of data or address for each of four memory access channels. Since the data and address fields of a memory access request are 32 and 23 bits wide, respectively, a total of seven bit slice MCI devices are needed to implement an MCI unit. Similarly, each MMI bit slice device handles a 4-bit slice of data or address information. Thus, fourteen bit slice MMI devices are needed to implement one MMI unit.

A bit slice MCI device is shown in FIG. 13. This device processes ann 8-bit slice of data or address of each of four channels CH0, CH1, CH2, CH3. This is the slice version of the full MCI unit shown in FIG. 8. The bit slice MCI device includes a buffer matrix 302 with sixty-four 8-bit registers. Illustrating the registers are implemented using tri-ported SRAMs. Channel control circuitry 304 for each of the four channels routes memory access requests to the buffer matrix 302. In particular, for video input signals the channel control circuit 304 supplies memory addresses and synchronizes memory access requests. For still image signals the address are supplied externally. Each channel control circuitry 204 produces a DATA output which comprises memory access requests and an ADDR output which indicates the register in the buffer matrix 302 in which a memory access request is to be stored. The RQSTED output provides information as which registers in buffer matrix 302 have valid memory access requests during a particular memory frame (a memory frame is the time between two servicings of a register R0 by a particular MMI and illustratively equals 16 memory clock cycles). This information is stored in the registers requested storage device 306 and is communicated to the MMIs via the ports PORT 0, PORT 1, PORT 2, PORT 3. The Output Address generator 307 generates the addresses of the registers in the buffer 302 using the round robin sequence discussed above. Using the information contained in the Registers Requested buffer, the MMIs are informed as to whether or not a memory access request is contained in a particular register indicated by the output address generator.

The channel control circuit 304 of FIG. 13 is shown in greater detail in FIG. 14. Illustratively, the circuit 304 comprises two 10-bit address generators 332 and 334 and one 4-bit address generator 336. The address generators are controlled by a finite state machine 338. The address generator 332, 334, 336 are pin programmable with initial address, final address and address increment. The 4-bit address generator 336 (or an externally supplied address via the channel CH0, for example) indicates in which register in the matrix 302 of FIG. 13 a particular memory access request arriving via channel CH) is to be stored. The circuit 338 detects repeated requests for the same register. As indicated above, each register is serviced at a rate of 1 MHz. The MCI device will not grant a second request to particular register until the requested register has been serviced by an MMI. This prevents the rewriting of a register before it has been serviced by an MMI.

As indicated above, the time interval between two consecutive services by an MMI of the register R0 is defined as a memory frame. As indicated above, the time of a memory frame is equal to sixteen cycles of a basic memory clock. The device 340 stores both a count of the valid memory requests and information concerning registers in the buffer matrix 302 of FIG. 13 storing memory access requests during each memory frame. The registers requested information is passed to the device 306 of FIG. 13 via the handshake circuit 342. An output of the handshake circuit 342 forms the RQESTD output of the circuit 304.

The synchronization of the channel CH0 of FIG. 14 to the memory clock is achieved using asynchronous FIFOs 350, 352, which are controlled by the finite state machine 354. The inputs to the FIFOs 350, 352 are enabled for non-repeated requests during each memory frame. Image data (R.B. Ban key byte) and raster addresses are transmitted to the FIFO 350 via the selector circuit 360. The output of the FIFI 350 forms the DATA output of the circuit 304 transmitted to the FIFO 352 from the address generator 336. An output of the FIFO 352 forms the ADDR output of the circuit 304.

Information is written into the FIFO's asynchronously according to a clock (not shown) associated with the channel CH0 and written out of the FIF's synchronously with the memory clock. Thus, any difference between the two clocks is taken up by the buffering capacity of the FIFOs. The finite state machine 352 enables the output of the FIFOs on the 16th cycle of the memory clock only if the 16th cycle of the channel clock has occurred immediately before. Once this output condition is detected, the output of the FIFO 350, 352 remain enabled for the number of valid requests counted during the previous "channel frame". This information is communicated to the FIFO's via the handshake circuit 342 and finite state machine 354. The synchronization of flags and controls between the channel and memory clocks is done by the handshake circuit 342. The writing of valid memory access request into the FIFOs 350, 352 is indicated by a signal on line 370.

C. Conclusion

A processor which assembles a plurality of still image and video input signal into a full bandwidth color component high resolution output display has been disclosed. Such output displays are achieved through use of a key based memory access system and a specially developed memory architecture.

Finally, the above-described embodiments of the invention are intended to be illustrative only. Numerous alternative embodiments may be devised without departing from the spirit and scope of the following claims.

We claim:

1. A processor for producing a high definition television image comprising first input means for simultaneously receiving in real time a plurality of full motion video signals, second input means for receiving one or more still image video signals, a memory system including storage means for storing a raster array of pixel locations in which a group of overlapping windows are defined, and output means for outputting a composite high definition television signal for forming a high definition television image comprising a plurality of real time full motion video sub-images corresponding to said plurality of full motion video signals and occupying a plurality of said windows and one or more still sub-images corresponding to said one or more still image video signals and occupying one or more of said windows, said memory system further including transfer means in communication with said storage means for simultaneously transferring in real time data comprising said plurality of full motion video signals and said one or more still image video signals from said first and second input means into said storage means at pixel locations defined by said windows to form frames of said high definition television signal and for transferring in real time data comprising said frames of said high definition television signal out of said storage means to said output means, wherein said first input means includes video image processing means for said full motion video signals and said second input means including still image interface means for enabling said still image video signals to access said memory system.

2. The processor of claim 1 wherein said first input means comprises means for receiving said full motion video signals in analog form and means for digitizing said full motion video signals.

3. The processor of claim 2 wherein said video image processing means comprises scaling means for scaling said full motion video signals so that the corresponding full motion video images fit in particular ones of said windows.

4. The processor of claim 1 wherein each pixel location in said raster array of said storage means stores a predetermined key value indicating the visibility of a particular one of said windows at the pixel location, a pixel of one of said full motion video or still image signals being transferred into a pixel location of said storage means when the pixel includes a key value corresponding to the predetermined key value of the pixel location.

5. The processor of claim 1 wherein a plurality of video signals are transferred out of said storage means and wherein said output means includes a multiplexer for multiplexing said plurality of video signals transferred out of said storage means to form said high definition television signal.

6. The processor of claim 1 wherein said storage means comprises a plurality of memory modules, each of said memory modules storing a portion of a raster array of pixel locations so that together the memory modules form a complete raster array of pixel locations.

7. The processor of claim 6 wherein said first and second input means and said output means each comprise one or more memory access channels.

8. The processor of claim 7 wherein said transfer means comprises a plurality of memory channel interface units each associated with a plurality of memory access channels for receiving asynchronous memory access requests and for synchronizing and storing said memory access requests, said memory access requests including write requests for transferring said data of said full motion video and still image signals into said storage means and read requests for transferring said data comprising said frames of said high definition television signal from said storage means, and a plurality of memory module interface units for communicating synchronously with said memory modules to service said memory access requests stored in said memory channel interface units.

9. The processor of claim 8 wherein each of said memory channel interface units comprises a set of registers for each memory access channel associated therewith, each set of registers including one register corresponding to each of said memory modules, each of said memory access requests being buffered in a register corresponding to the memory module to which the memory access request pertains.

10. The processor of claim 9 wherein each of said memory module interface units communicates memory access requests between a subset of said memory modules and the registers in said memory channel interface units corresponding to the subset of memory modules.

11. The processor of claim 10 wherein each of said memory module interface units successively enables each memory module in its associated subset of memory modules to be in communication with each of said memory channel interface units for serving memory access requests stored in the memory channel interface units.

12. A processing system for forming a composite video image comprising a memory system including storage means for storing a raster array of pixel locations in which a plurality of overlapping windows are defined, first input means for simultaneously receiving in real time a plurality of full motion video signals, second input means for receiving a still image video signal, and output means for outputting a composite video signal for forming a composite video image comprising a plurality of real time full motion video sub-images corresponding to said plurality of full motion video signals and at least one still sub-image corresponding to said still image video signal, said memory system further including transfer means in communication with said storage means for simultaneously transferring in real time data comprising said plurality of full motion video signals and said still image video signal from said first and second input means into specific windows of said raster array in said storage means to form frames of said composite video signal and for transferring from said storage means to said output means in real time said frames of said composite video signal, wherein said first input means includes video image processing means for said full motion video signals and said second input means includes still image interface means for enabling said still image video signals to access said memory system.

13. The processing system of claim 12 wherein said composite video signal is a high definition television signal.

14. The processing system of claim 13 wherein said output means comprises a multiplexer and wherein said transfer means transfers a plurality of signals to said multiplexer for forming said composite video signal.

15. A processing system for forming in real time a composite high definition television image comprising a plurality of full motion video sub-images and a plurality of still sub-images, said processing system comprising a memory system including storage means comprising a plurality of memory modules for storing an array of pixel locations, a plurality of input channels for simultaneously receiving in real time a plurality of full motion video signals and for receiving a plurality of still image video signals, said input channels including video image processing means for processing said full motion video signals and still image interface means for processing said still image signals, and one or more output channels for outputting a high definition television signal for forming a composite high definition television image comprising a plurality of real time full-motion video sub-images corresponding to said plurality of full motion video signals and a plurality of still sub-images corresponding to said plurality of still image video signals, said memory system further including high bandwidth transfer means comprising a plurality of memory interface units for interfacing said input and output channels with said memory modules, said transfer means having sufficient bandwidth for simultaneously transferring in real time data comprising said plurality of full motion video signals and said plurality of still image video signals from said input channels into said memory modules to form frames of said high definition television signal and for transferring said frames of said high definition television signal in real time out of said memory modules to said one or more output channels.

* * * * *